United States Patent [19]

Goel

[11] Patent Number: 4,728,710

[45] Date of Patent: Mar. 1, 1988

[54] SAG RESISTANT URETHANE ADHESIVES WITH IMPROVED ANTIFOAMING PROPERTY

[75] Inventor: Anil B. Goel, Worthington, Ohio

[73] Assignee: Ashland Oil, Inc., Ashland, Ky.

[21] Appl. No.: 935,862

[22] Filed: Nov. 28, 1986

[51] Int. Cl.⁴ .............................................. C08G 18/30
[52] U.S. Cl. ........................................ 528/58; 528/60; 528/62; 528/64; 528/66; 528/903; 528/905
[58] Field of Search ....................... 528/58, 60, 62, 64, 528/66, 903, 905

[56] References Cited

U.S. PATENT DOCUMENTS 4,444,976  4/1984  Rabito ................................... 528/60
4,582,890  4/1986  Tufts et al. ............................ 528/60

Primary Examiner—Maurice J. Welsh
Assistant Examiner—S. A. Acquah
Attorney, Agent, or Firm—John F. Jones

[57] ABSTRACT

An improved antifoaming two component polyurethane adhesive comprising a first component composed of a polyisocyanate prepolymer and a second component composed of a polyol, a poly amine and a bicyclic amide acetal is described.

8 Claims, No Drawings

SAG RESISTANT URETHANE ADHESIVES WITH IMPROVED ANTIFOAMING PROPERTY

The present invention relates to an improved polyurethane adhesive which has little or no tendency to foam when formed and more particularly pertains to an improved two component polyurethane adhesive having low foaming tendency which results from the inclusion of a bicyclic amide acetal in the adhesive formulation.

Two component urethane adhesives are well known (U.S. Pat. Nos. 3,714,127; 3,812,003; 3,886,122; 3,935,051; 4,444,976 and elsewhere) and are widely used to adhere substrates such as plastic adherends together. The choice of urethane adhesives over other adhesives is based in part upon their outstanding characteristics with respect to bond strengths, flexibility, shock and impact resistance, etc. However, the prior art urethane adhesives are also known to have foaming problems, especially when used under high humidity conditions of bonding or when the surface of the substrate or substrates to be bonded is contaminated with moisture. Foaming at the surface of the bond caused by reaction of moisture with the isocyanate groups of the adhesive during the cure of the adhesive results in weaker bonding than can be obtained under anhydrous conditions. The use of bicyclic amide acetals in polyurethane adhesives to eliminate this foaming problem has not previously been disclosed.

I have found that two component urethane adhesives comprising a first component which includes a polyisocyanate or polyisocyanate prepolymer and a second component which is a curative component including a mixture of polyols, amines, urethane and/or isocyanurate catalyst and a bicyclic amide acetal give non-sagging adhesive compositions with improved antifoaming behavior and excellent adhesion to reinforced plastics, metals, and other structural type of substrates. In practice, the two components are mixed shortly before the resulting adhesive is applied to the surface to be bonded.

Two component urethane adhesives used to adhere structural substrates such as reinforced plastics, metals and glass are well known and have been commercially available for more than two decades. The choice of urethane adhesives over other classes of adhesives is based on their outstanding flexibility, bond strength, shock and impact resistance, durability, chemical inertness and other desirable properties. Generally speaking, conventional polyurethane adhesives are gravity flowable when mixed, highly viscous two component systems wherein one component is composed of an isocyanate prepolymer and the second component is composed of groups, small amounts of di-or poly-primary or secondary amines and selected urethane catalysts. The polyurethane adhesives formed by blending the two components provide the non-sag property by the initial immediate reaction of polyisocyanate with polyamine, followed by the curing of polyols with polyisocyanate. The conventional urethane adhesives based on the above polymerization reactions are known to have poor antifoaming property. The foaming is probably caused by the hygroscopic nature of the polyols which absorb moisture from the atmosphere under high humidity conditions and the generation of carbon dioxide gas results upon interaction of the isocyanate groups with the moisture and this causes foaming in the adhesive. Such foaming results in decreasing the density of the adhesive and decreased contact area between adhesive and substrate and resulting weakening of the adhesive bond.

Furthermore, sometimes the surfaces of the substrates to be adhered also have adsorbed or absorbed moisture on them which can cause foaming at the interface of the adhesive and substrate which can cause weakening of the adhesive bond. This latter problem of adsorbed or absorbed moisture at or on the surface of the substrate has been attacked in the prior art by use of a polyisocyanate or silane-based primer on the surface of the substrate. The foaming related to the use of urethane adhesive and coating compositions has also been attacked in the prior art by using additives such as molecular sieves and ketimines in the adhesive. Although these additives do help solve the foaming problems to some extent, they cause some other problems such as viscosity increase, toxicity and product performance variations.

The primary objective of this invention is to provide an improved antifoaming polyurethane adhesive system which produces bonds having excellent flexibility, shock and impact resistance, high adhesion strength and the like without having any increased adverse problems such as processing variation and toxicity.

I have discovered that improved antifoaming polyurethane adhesives can be prepared by using a small amount of a bicyclic amide acetal in the curataive component of a two component polyurethane adhesive composition. The two component adhesive system of this invention is composed of a first component comprising a polyisocyanate prepolymer obtained by the reaction of small amount of a poly(alkylene oxide) diol with an excess (greater than two equivalents of NCO per hydroxy group) of a polyisocyanate and optionally small amounts (up to 30% by weight of the other components) of essentially hydroxyl-free diepoxide resin for high heat resistance of the adhesive and optionally filled with fillers such as talc, kaolin, aluminum oxide, fumed silicia, powdered metal, metal oxides, ferrite, and the like and a second component which is the curataive component comprising a mixture of polyols (polyether or polyester polyols) and primary or secondary aliphatic or aromatic di-or polyamine in weight ratio ranging from 99.5:0.5% to 70:30% along with small amounts (0.2 to 5% by weight of total polyols and amines) of bicyclic amide acetal and urethane and/or isocyanurate catalyst and the curative may be filled with fillers such as talc, fumed silica, kaolin, aluminum oxide, powdered metals, metal oxides, ferrites, and the like.

Bicyclic amide acetals useful in this invention include those having the following formula:

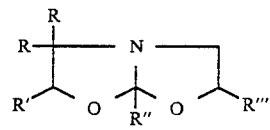

wherein R, R' and R''' independently represent hydrogen, an alkyl or alkyl ether group having from 1 to 20 carbon atoms, an aryl or aryl ether group having from 6 to 20 carbon atoms or an alkaryl group having from 7 to 20 carbon atoms and R'' represents an alkyl group having from 1 to 20 carbon atoms or an alkaryl group having from 7 to 20 carbon atoms.

Polyisocyanates useful in this invention include organic isocyanates having at least two isocyanate groups per molecule. The polyisocyanate can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylylene-1,3-diisocyanate,4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

The use of bicyclic amide acetals in the polyurethane adhesives of this invention in addition to their antifoaming function also act as chain extenders which also helps improve the filler dispersibility in the adhesive.

Preferred urethane catalysts for the purposes of the present invention include tertiary amines such as triethylene diamine, N,N'',N'''-tris(dimethylaminopropyl)-hexahydrotriazine, tris(dimethylaminomethyl)phenol, organotin catalysts such as dibutyltin dicarboxylate, stannous octoate and the like, carboxylates and other salts of metals such as potassium, iron, cobalt, nickel, vanadium, bismuth, antimony, lead, zinc, copper and the like which are known in the prior art for this purpose and the cationic catalysts (such as tetraalkyl ammonium salts) especially when epoxy additive is used in the prepolymer formulation. The amounts of such urethane and other catalysts used in any case depends on the desired open time (pot life) and cure time requirements and can be in the range of from 0.01 to about 8% by weight based on the weight of the other ingredients in the curative component.

The adhesive compositions of this invention when mixed in NCO to hydroxy equivalent ratios ranging from 0.5:1 to 2:1, and preferably from 0.8:1 to 1.5:1, provide a non-sagging adhesive which exhibits excellent adhesion to a wide variety of substrates including reinforced plastics, metals, wood, glass and the like with practically no foaming at the adhesive-substrate bond. In many cases the adhesive formulations of this invention can be used on such substrates without the use of any surface modifying primer or any other treatment.

This invention is further illustrated in the following representative examples.

EXAMPLE 1

An isocyanate prepolymer was prepared by reacting 43.7 parts by weight of a 2000 molecular weight poly(-propylene oxide) diol capped with ethylene oxide with 13.5 parts by weight of oligomeric methylene bis(phenyl isocyanate) (NCO functionality of 2.7) followed by mixing with 23.7 parts by weight of liquid methylene bis(phenyl isocyanate) (NCO functionality of 2.1) and 23.8 parts by weight of dry talc filler. The degassed liquid prepolymer component which resulted was designated as P1.

EXAMPLE 2

An isocyanate prepolymer having long shelf life was prepared by mixing 118 g of liquid methylene bis(phenyl isocyanate) (NCO equivalent weight of about 144) at 80° C. with 132.1 g of a mixture obtained by blending 59 g of ethylene oxide capped poly(propylene oxide) diol (hydroxy equivalent weight of 500), 28.3 g of liquid diglycidyl ether of Bisphenol-A (epoxy equivalent weight of 180-190) and 62.3 g of kaolin filler. This prepolymer component was found to have about 11.7% NCO and was designated P2.

EXAMPLE 3

A curative component was prepared by reacting 53 parts by weight of poly(propylene oxide) tetraol (hydroxyl number 450), with 1.96 parts by weight of toluene diisocyanate followed by mixing with 1.6 parts by weight of bicyclic amide acetal in which R, R', and R''' each represents hydrogen and R'' represents a methyl group, 5.3 parts by weight of fumed silica (Aerosil 200), 1.51 parts by weight of piperazine and 0.4 parts by weight of triethylene diamine and the resulting mixture was degassed under reduced pressure and was designated curative component C1.

EXAMPLE 4

A curative component was prepared by reacting 78 parts by weight of poly(propylene oxide) triol capped with ethylene oxide (hydroxy equivalent weight of approximately 1167) with 2.95 parts by weight of toluene diisocyanate followed by mixing with 34.76 parts of ethylene oxide capped poly(propylene oxide) tetraol (hydroxy number 450). This mixture was treated with 1.5 parts by weight of the bicyclic amide acetal of Example 3 and was filled with 41.8 parts by weight of dry kaolin filler, with 0.12 parts by weight of ferric acetylacetonate, 0.064 parts by weight of stannous octoate and 1.54 parts by weight of piperazine. This curative component was degassed to give a liquid material having a viscosity of about 8000 cps and was designated C2.

EXAMPLE 5

A curative component was prepared by following the procedure of Example 3 except that no bicyclic amide acetal was included. This curative component is a typical prior art component and is outside the scope of the present invention but is included for comparison purposes and was designated C3.

EXAMPLE 6

The following is the general procedure for preparing and testing adhesive bonds used in the succeeding examples. The two components of the adhesive were mixed in appropriate weight ratios under an inert (nitrogen) atmosphere at room temperature and the resulting adhesive mixture was applied in the form of ⅜" beads across the surface of the substrate (fiberglass reinforced polyester sheet called sheet molding compound or SMC laminates) that measure 12"×4"×100 mils (thickness) after the surface to which the adhesive was to be applied was first wiped clean with a dry cloth or in some cases with a cloth treated with methylene chloride. After sprinkling a few 30 mils diameter glass beads on the applied adhesive beads to obtain a final glue line thickness of 30 mils, a second sheet was placed on top of the first with a one-inch overlap. The samples were then placed in a 200° F. heated fixture under a pressure of about 1 psi for about 3 minutes to obtain the initial curing of the adhesive. The samples were then transferred to an oven maintained at 285° F. for postcuring for 30 minutes. Test specimens were cut from the cured samples (one inch strips) for testing as follows:
(A) Lap shear test at room temperature.
(B) Lap shear test at 180° F.
(C) Lap shear test at room temperature after immersion in 206° F. water.

EXAMPLE 7

The prepolymer (P1) of Example 1 and the curative (C1) of Example 3 were mixed in a 4:1 weight ratio under an inert atmosphere for one minute to give a non-sagging adhesive. This adhesive was applied on the surface of a SMC sheet in the form of a bead approximately 200 mils thick and the bead was cured by placing the SMC on a hot place (adhesive side up) set at 200° F. for 3 minutes during which time the adhesive bead gelled to give a non-tacky polymer. This adhesive sample, showing no observable foam or bubbles either on the surface or in the middle of the adhesive bead, was placed in an oven at 285° F. for 30 minutes for cure. An attempt to peel the adhesive bead after curing from the SMC surface by using a sharp chisel resulted in fiber tear from the SMC rather than adhesive failure.

EXAMPLE 8

This example is for comparative purposes and is outside the scope of the present invention. The procedure of Example 7 was followed using the prepolymer (P1) of Example 1 and the curative of Example 5 (C3). The cured bead on the SMC was found to have numerous tiny foam bubbles on the adhesive surface as well as within the adhesive. The adhesive bead was easily peelable from the SMC sheet with cohesive failure probably caused by the microbubbles at the interface of the SMC sheet and the adhesive.

EXAMPLES 9-17

The adhesive bonds on sheet molding compound (SMC) samples using various prepolymer components and curative components were determined following the procedures of Example 6. The materials used and the results obtained are given in the following Table.

TABLE

| Example No | Test Procedure | Lap Shear Strength (psi) | | |
|---|---|---|---|---|
| | | P1/C1 | P1/C3 | P2/C2 |
| 9 | A | 615 DL | 485 DL | 630 DL |
| 10 | A | 550 DL | 490 FT | 570 DL |
| 11 | A | 585 DL | 510 DL | 580 DL |
| 12 | B | 440 DL | 320 CF | 420 DL |
| 13 | B | 360 DL | 370 FT | 400 DL |
| 14 | B | 340 DL | 350 CF | 430 DL |
| 15 | C | 390 DL | 400 CF | 490 DL |
| 16 | C | 585 DL | 480 DL | 530 DL |
| 17 | C | 490 DL | 470 FT | 515 DL |

P1=Prepolymer of Example 1;
C1=Curative of Example 3
P2=Prepolymer of Example 2;
C2=Curative of Example 4
C3=Curative of Example 5;
DL=Substrate Delaminated;
FT=Surface Fiber Tear;
CF=Cohesive Failure The adhesive system P2/C2 was mixed in 1/1 weight ratio while P1/C1 and P1/C3 were mixed in 4/1 weight ratios.

I claim:

1. An improved antifoaming polyurethane adhesive comprising a mixture of a first component comprising a polyisocyanate prepolymer and a second component comprising a polyol, a polyamine and a bicyclic amide acetal wherein in the second component the weight ratio of polyol to polyamine is in the range of from 99.5:0.5% to 70:30% and the bicyclic amide acetal is present in from 0.2 to 5% by weight based on the total weight of polyol and polyamine.

2. The adhesive of claim 1 wherein the bicyclic amide acetal is one having the formula

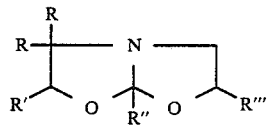

wherein R, R' and R''' independently represent hydrogen, an alkyl or alkyl ether group having from 1 to 20 carbon atoms, an aryl or aryl ether group having from 6 to 20 carbon atoms or an alkaryl group having from 7 to 20 carbon atoms and R'' represents an alkyl group having from 1 to 20 carbon atoms or an alkaryl group having from 7 to 20 carbon atoms.

3. The adhesive of claim 2 wherein the polyisocyanate prepolymer is one obtained by the reaction of a poly (alkylene oxide) diol with an excess of a polyisocyanate.

4. The adhesive of claim 3 wherein the second component polyol is a mixture of polyether or polyester polyols and the polyamine is a primary or secondary aliphatic or aromatic polyamine.

5. The adhesive of claim 4 wherein the polyisocyanate prepolymer is prepared from polypropylene diol capped with ethylene oxide and methylene bis(phenyl isocyanate).

6. The adhesive of claim 5 wherein the second component is comprised of a bicyclic amide acetal in which R, R' and R''' each represents hydrogen and R'' represents a methyl group.

7. The adhesive of Example 6 wherein the second component polyamine is a mixture of piperazine and triethylene diamine.

8. The adhesive of Example 6 wherein the second component comprises piperazine and stannous octoate.

* * * * *